US 11,200,657 B2

United States Patent
Gubbi Lakshminarasimha et al.

(10) Patent No.: US 11,200,657 B2
(45) Date of Patent: Dec. 14, 2021

(54) METHOD AND SYSTEM FOR SEMANTIC CHANGE DETECTION USING DEEP NEURAL NETWORK FEATURE CORRELATION

(71) Applicant: TATA CONSULTANCY SERVICES LIMITED, Mumbai (IN)

(72) Inventors: Jayavardhana Rama Gubbi Lakshminarasimha, Bangalore (IN); Akshaya Ramaswamy, Chennai (IN); Balamuralidhar Purushothaman, Bangalore (IN); Ram Prabhakar Kathirvel, Bangalore (IN); Venkatesh Babu Radhakrishnan, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/006,558

(22) Filed: Aug. 28, 2020

(65) Prior Publication Data
US 2021/0065354 A1    Mar. 4, 2021

(30) Foreign Application Priority Data
Aug. 30, 2019  (IN) .............................. 201921035115

(51) Int. Cl.
*G06K 9/00*   (2006.01)
*G06T 7/00*   (2017.01)

(52) U.S. Cl.
CPC ........ *G06T 7/0002* (2013.01); *G06K 9/00624* (2013.01); *G06T 7/97* (2017.01);
(Continued)

(58) Field of Classification Search
CPC ..................... G06T 7/0002; G06T 7/97; G06T 2207/20081; G06T 2207/20084; G06T 2207/20224; G06K 9/00624
(Continued)

(56) References Cited

U.S. PATENT DOCUMENTS 8,824,797 B2 *  9/2014  Salamati ................. G06T 7/162
                                                                 382/173
10,157,331 B1   12/2018  Tang et al.
(Continued)

*Primary Examiner* — Jonathan S Lee
(74) *Attorney, Agent, or Firm* — Finnegan, Henderson, Farabow, Garrett & Dunner, LLP

(57) ABSTRACT

State of the art image processing techniques such as background subtraction, and Convolutional Neural Network based approaches, when used for change detection, fail to support certain datasets. The disclosure herein generally relates to semantic change detection, and, more particularly, to a method and system for semantic change detection using a deep neural network feature correlation approach. An adaptive correlation layer is used by the system, which determines extent of computation required at pixel level, based on amount of information at pixels, and uses this information in further computation done for the semantic change detection. Information on the determined extent of computation required is then used to extract semantic features, which is then used to compute one or more correlation maps between the at least one feature map of a test image and corresponding reference image. Further the semantic changes are determined from the one or more correlation maps.

12 Claims, 6 Drawing Sheets

(52) U.S. Cl.
CPC ............... *G06T 2207/20081* (2013.01); *G06T 2207/20084* (2013.01); *G06T 2207/20224* (2013.01)

(58) Field of Classification Search
USPC ........................................................ 382/100
See application file for complete search history.

(56) References Cited

U.S. PATENT DOCUMENTS

| | | | |
|---|---|---|---|
| 10,878,577 B2 * | 12/2020 | Morrison | ................ G06T 7/215 |
| 11,024,037 B2 * | 6/2021 | Du | ....................... G06K 9/4628 |
| 2018/0108137 A1 | 4/2018 | Price et al. | |

* cited by examiner

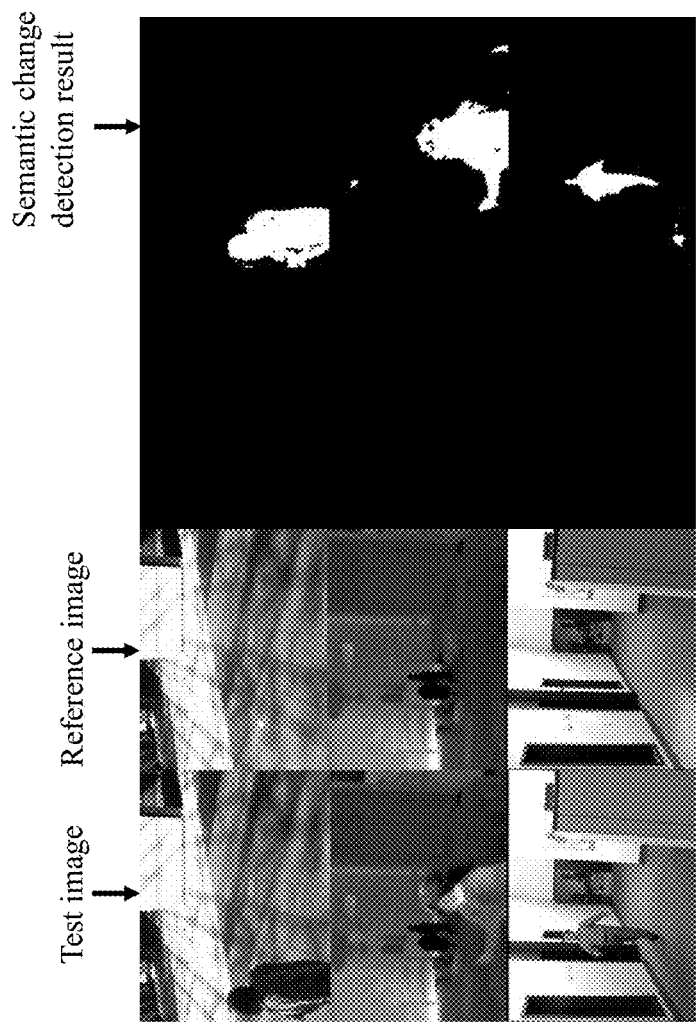

METHOD AND SYSTEM FOR SEMANTIC CHANGE DETECTION USING DEEP NEURAL NETWORK FEATURE CORRELATION

Priority Claim

This U.S. patent application claims priority under 35 U.S.C. § 119 to: India Application No. 201921035115, filed on Aug. 30, 2019. The entire contents of the aforementioned application are incorporated herein by reference.

TECHNICAL FIELD

The disclosure herein generally relates to semantic change detection, and, more particularly, to a method and system for semantic change detection using a deep neural network feature correlation approach.

BACKGROUND

Change detection is performed to identify changes that may have happened in a particular place and/or on an object being considered, over a period of time. For example, consider a geographical area. Over a period of time, many changes would have taken place in that area such as cutting/planting new trees, new buildings, and old building demolished and so on. In another example, consider a mechanical equipment. Such equipment are prone to wear and tear over a period of time. By virtue of the change detection process, most of such changes can be identified.

Typically, the change detection can be performed using a foreground extraction (also known as 'background subtraction') process. In an image based change detection, usually foreground objects are the objects of interest. By performing the foreground extraction, the objects are identified and data with respect to the objects are collected, which in turn can be processed to perform the change detection. During the change detection, a captured image of a scene/object is compared with an estimated background model corresponding to the scene/object. In such existing techniques, accuracy of the change detection depends on accuracy of the estimated background model.

The inventors here have recognized several technical problems with such conventional systems, as explained below. Convolutional Neural Networks (CNN), in deep learning, is a class of deep neural networks, usually applied to analyze visual imagery. CNN based foreground extractors are known to perform better in comparison with other image matching techniques currently existing. However a disadvantage of the existing CNN based systems is that they fail to give intended result with certain datasets, for example, the state of art CNN based systems have been identified as giving low accuracy with GSV and TSUNAMI datasets.

SUMMARY

Embodiments of the present disclosure present technological improvements as solutions to one or more of the above-mentioned technical problems recognized by the inventors in conventional systems. For example, in one embodiment, a processor implemented method of semantic change detection is provided. In this method, a test image and a reference image of a scene are obtained as input, via one or more hardware processors. Further, at least one feature map each is generated separately for each of the test image and the reference image, via one or more hardware processors. The generated at least one feature map of the test image and the reference image are then processed using an adaptive correlation layer, via the one or more hardware processors. At this stage, an extent of computation required at each pixel of the test image and corresponding pixel of the reference image is determined, by processing the generated at least one feature map, wherein the computation required at each pixel is determined based on amount of information at each pixel. Further, a plurality of semantic features are extracted from the at least one feature map of the test image and the feature map of the reference image. Further, at least one correlation map between the at least one feature map of the reference image and the at least one feature map of the test image is computed, based on the determined extent of computation required at each pixel. Further, by processing the at least one correlation map, one or more semantic changes between the test image and the reference image are determined.

In another aspect, a system for semantic change detection is provided. The system includes one or more hardware processors, a communication interface, and a memory storing a plurality of instructions. The plurality of instructions when executed, cause the one or more hardware processors to obtain a test image and a reference image of a scene, as input. Further, at least one feature map each is generated separately for each of the test image and the reference image, via one or more hardware processors. The generated at least one feature map of the test image and the reference image are then processed using an adaptive correlation layer, via the one or more hardware processors. At this stage, an extent of computation required at each pixel of the test image and corresponding pixel of the reference image is determined, by processing the generated at least one feature map, wherein the computation required at each pixel is determined based on amount of information at each pixel. Further, a plurality of semantic features are extracted from the at least one feature map of the test image and the at least one feature map of the reference image. Further, at least one correlation map between the at least one feature map of the reference image and the at least one feature map of the test image is computed, based on the determined extent of computation required at each pixel. Further, by processing the at least one correlation map, one or more semantic changes between the test image and the reference image are determined.

In yet another aspect, a non-transitory computer readable medium for semantic change detection is provided. The non-transitory computer readable medium includes a plurality of instructions, which when executed cause one or more hardware processors to perform the semantic change detection. The semantic change detection includes the following steps. Initially, a test image and a reference image of a scene are obtained as input, via one or more hardware processors. Further, at least one feature map is generated separately for each of the test image and the reference image, via one or more hardware processors. The generated at least one feature map of the test image and the reference image are then processed using an adaptive correlation layer, via the one or more hardware processors. At this stage, an extent of computation required at each pixel of the test image and corresponding pixel of the reference image is determined, by processing the generated at least one feature map, wherein the computation required at each pixel is determined based on amount of information at each pixel. Further, a plurality of semantic features are extracted from the at least one feature map of the test image and the at least one feature map of the reference image. Further, at least one correlation map between the at least one feature map of the reference image and the at least one feature map of the test image is computed, based on the determined extent of computation required at each pixel. Further, by processing the at least one correlation map, one or more semantic changes between the test image and the reference image are determined.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 illustrates an example representation of result of the semantic change detection being performed by the system of FIG. 1, in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
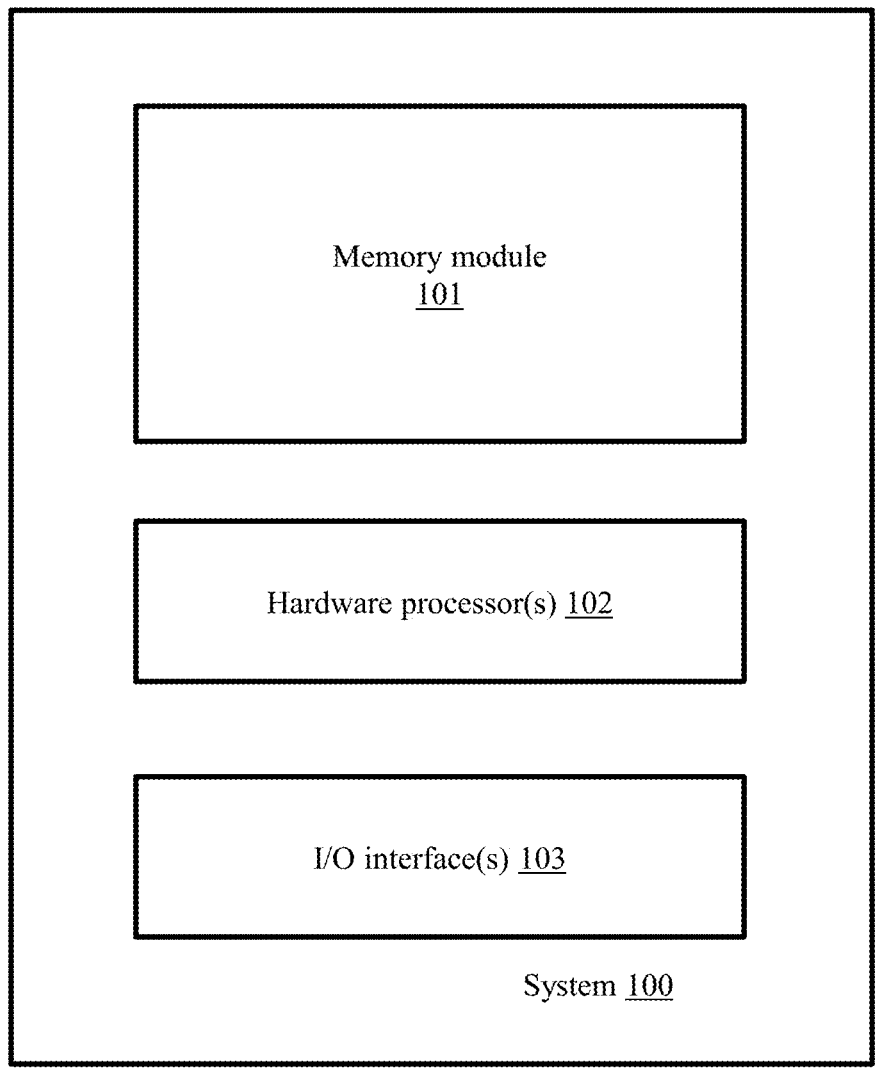
FIG. 1 illustrates an exemplary system for performing semantic change detection using Convolutional Neural Networks (CNN), according to some embodiments of the present disclosure.

FIG. 1 illustrates an exemplary system for performing semantic change detection using Convolutional Neural Networks (CNN), according to some embodiments of the present disclosure.

The system 100 includes one or more hardware processors 102, communication interface(s) or input/output (I/O) interface(s) 103, and one or more data storage devices or memory module 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory module(s) 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory module 101.

In order to perform the semantic change detection of a particular scene or object, a test image and a reference image of the scene/object are fed as input to the system 100. The term 'reference image' refers to a ground truth image, and the term 'test image' refers to an image of the same scene/object taken at a later point of time. Time difference between the reference image and the test image maybe in the form of nano/milli/micro seconds, minutes, hours, days, months, or years. The system 100 is configured to perform semantic change detection, by processing the test image and the reference image using an adaptive correlation layer. Architecture of the adaptive correlation layer is depicted in FIG. 2. The system 100 can be configured to perform the semantic change detection in a scene agnostic manner i.e. the semantic change detection can be performed irrespective of what scene or object is captured in the test image and the reference image fed as input to the system 100.

Figure 2A:
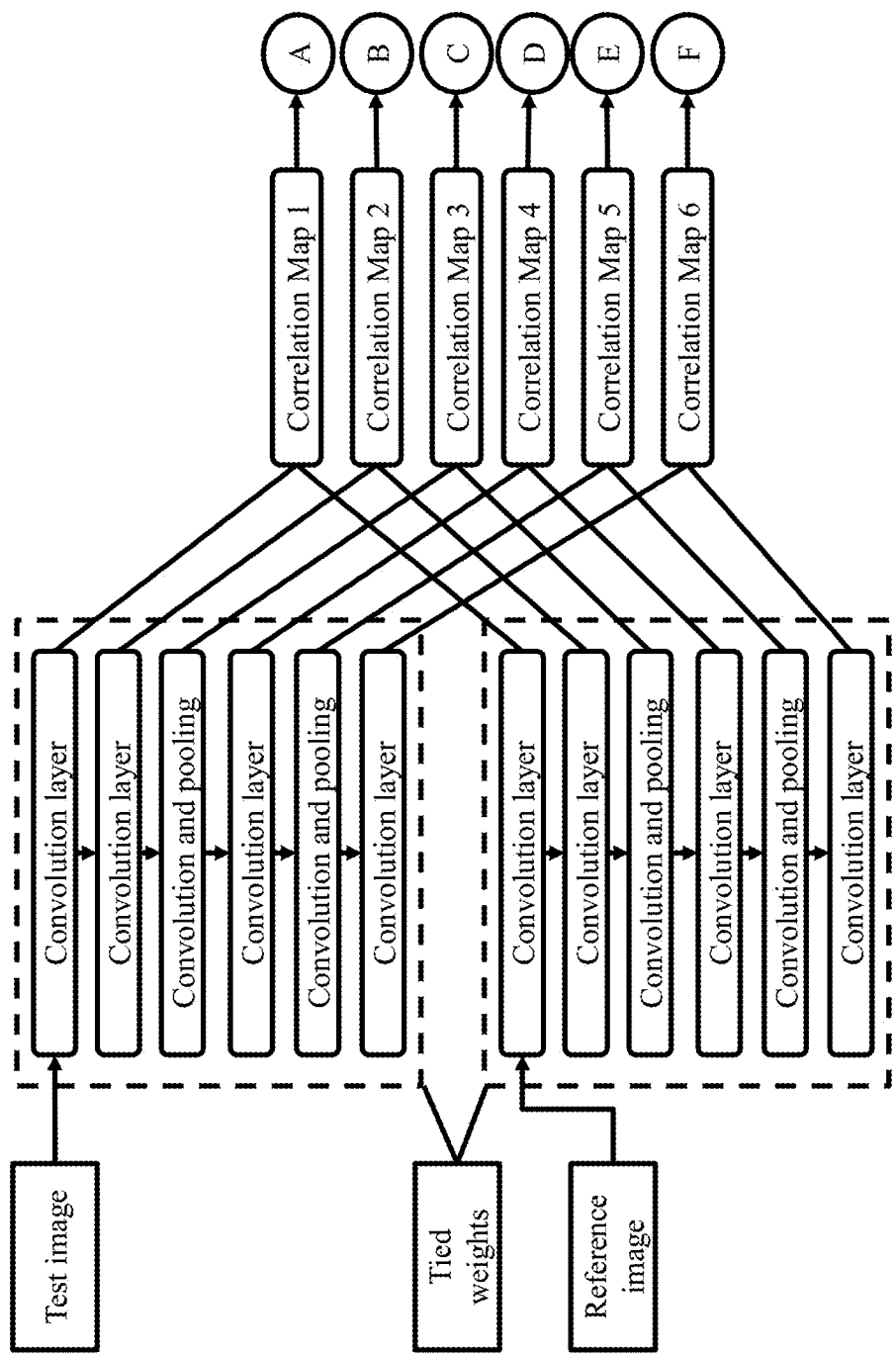
FIGS. 2A and 2B (collectively referred to as FIG. 2) is a functional implementation of the system of FIG. 1 as a correlation-deconvolution model, for semantic change detection, according to some embodiments of the present disclosure.
Figure 2B:
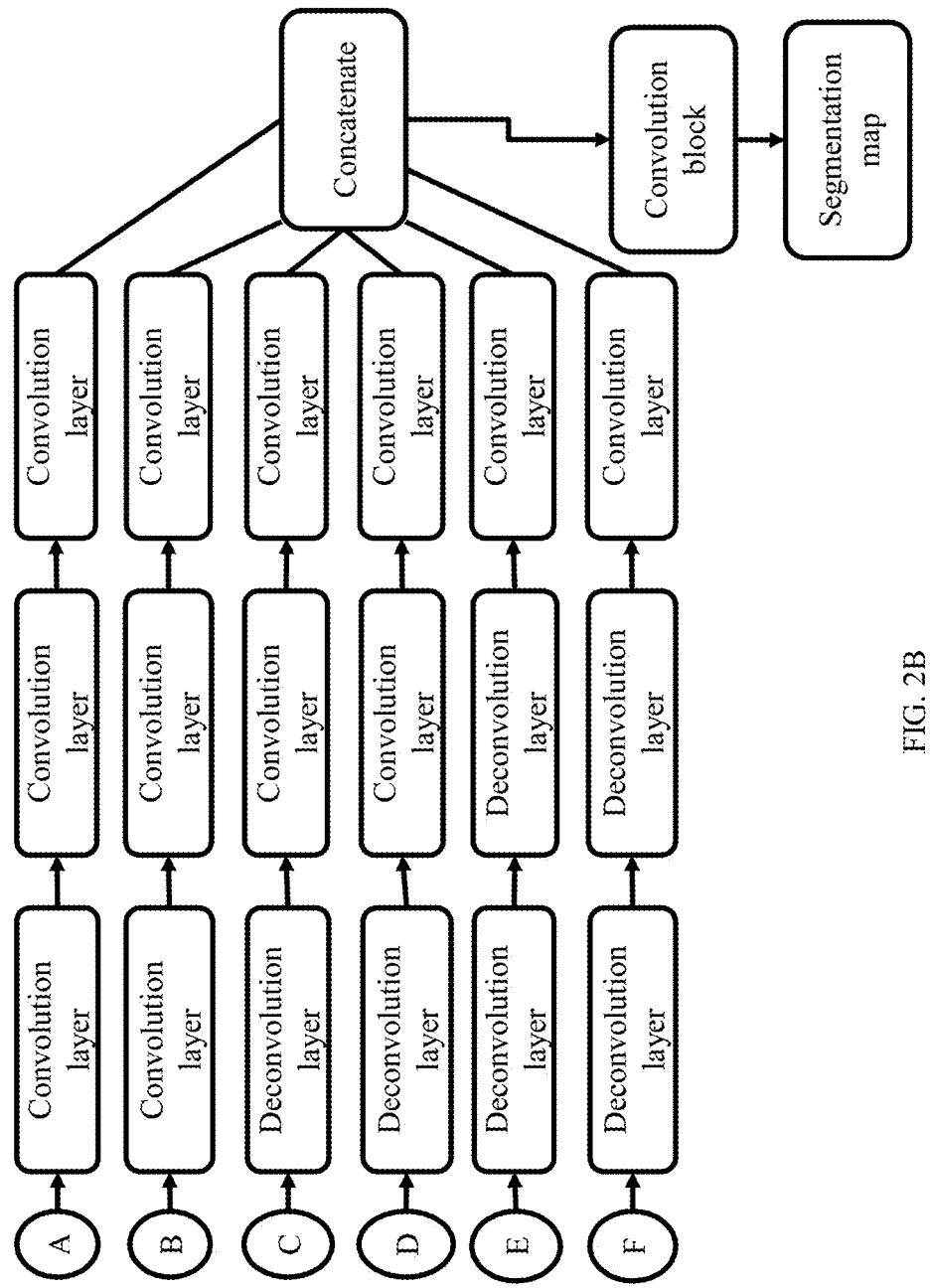

FIGS. 2A and 2B (collectively referred to as FIG. 2) depict architecture of the adaptive correlation layer used for the semantic change detection, according to some embodiments of the present disclosure.

As can be seen in FIG. 2, the system 100 is realized in the form of the adaptive correlation layer. In another embodiment, the adaptive correlation layer is an implementation of the This model has a Siamese Convolutional Neural Network (CNN) architecture, including two max pooling layers to condense maximum spatial features. Working of this model is explained below.

Let $I_1$ be the test image and $I_2$ the reference image (i.e. a frame static background). In order to segment a moving foreground object from the test image, $I_1$ and $I_2$ are fed as inputs to the adaptive correlation layer. Each set of the Siamese CNN architecture has 6 convolution layers each, one in each set having a max pooling layer to condense maximum spatial features. All the convolution layers have shared/tied weights. The convolution layers extract features containing semantic information about the test image and the reference image. The foreground objects can be extracted by subtracting features of the test and the reference images, only if both the test and reference images are registered. To make this possible for unregistered images as well, the correlation layer in the adaptive correlation layer computes pixel similarity. The correlation layer computes patch comparison between feature maps $f_1$ and $f_2$. Correlation between two patches $p_1$ (from $f_1$) and $f_2$ centered at a(x, y) is defined as:

$$C(p_1, p_2) = \Sigma_{o \in [-s,s]*[-s,s]} <f_1(p_1+o) \cdot f_2(p_2+o)> \qquad (1)$$

Where s is size of a support window sampled around a pixel. Bigger the value of s, higher the robustness to false matching. To find a relative displacement of $p_1$, the correlation operation is applied to all pixels in a search area T*T of $f_2$ centered at (x, y). This results in an output of $T^2$ correlation values for every pixel in $f_1$. A computed correlation map is then passed onto set of convolutional layers to obtain a binary segmentation map.

In order to find appropriate value of s, one of the two settings can be used: a. pixel correlation, or b. patch correlation. During experiments conducted, the patch correlation was found to be not offering sufficient improvement over the pixel correlation for extra computation. Also, with the correlation computed at the 6th convolution layer, the correlation computed at the first and the second convolution layers are added. Further, in addition to the max pooling being performed, correlation for all the feature maps in the Siamese CNN architecture are computed. As features at later layers in the Siamese network have different resolutions, they are up-sampled to same resolution using transpond convolution layers. The results depicted in FIG. 5 are for CDNet 2014 dataset. Similar results were obtained for datasets such as but not limited to GSV dataset, and TSU-NAMI dataset.

Having additional convolution layers in the deep neural network gives the system 100 multiple advantages: 1) introduction of new parameterized layers in the network enables training it end-to end, 2) creation of additional layers in the network makes it scene-agnostic, and the network learns to identify changes in a pair of images from any scene; therefore it is not required to re-train the network for a new scene, 3) addition of correlation layer makes the network robust to illumination variations between the two images (test image and reference image), 4) Computation of correlation at multiple levels (using the feature maps captured by the convolutional layers at various stages), ensures good performance in presence of camera motion between the test and reference images.

In the images being processed, the information may not be uniformly distributed across all the pixels in the images. Some of the pixels may contain more information in comparison with other pixels in the image. Depending on the information at each pixel, extent/amount of computation required also may vary. The adaptive correlation layer is configured to adapt itself to the data i.e. the extent of computations at each pixel, which in turn helps in reducing computational overhead of the system 100. This process is explained below:

Consider the two feature maps $f_t$ and $f_r$ of size h*w*c, where h is height, w is width, and c is number of feature channels. Correlation of two patches at location $l_1$ of $f_t^k$ and $l_2$ of $f_r$k is expressed as:

$$\text{correlation}(l_1, l_2) = \Sigma_{o \in [-s,s]*[-s,s]} <f_t^k(l_1+o), f_r^k(l_2+o)> \qquad (2)$$

Here the system 100 computes the correlation between two patches of size (2s+1,2s+1), and the correlation is computed over a fixed search area of T*T centred around $l_2$.

For every $l_1$ location at $f_t^k$, the system 100 compares a patch size of (2s+1,2s+1) of $f_t^k$ with $T^2$ locations centred at the $l_1$ location for $f_r^k$, which results in a correlation map $C^k$ of size (h*w*$T^2$).

Value of 's' in (2) may be calculated in different ways. In one embodiment, the adaptive correlation layer predicts value of s by appending features $f_t$ and $f_r$ and passing the appended value as input to a couple of convolutional layers. Output of the convolutional layers, of shape h*w, which is predicted at each location denotes s value for that particular pixel. In another embodiment, a variable with size (h, w) is initialized with integer values. This variable has the 's' value at every location and is the learnable parameter that gets updated during training.

In yet another embodiment, the correlation map $C^k$ of size (h*w*$T^2$) is multiplied with another tensor of same size G. For each location h*w, the system 100 initializes a Gaussian kernel G of size T*T with mean µ and standard deviation σ, as:

$$G(x) = \frac{1}{\sigma\sqrt{2\pi}} e^{\frac{-(x-\mu)^2}{2\sigma^2}} \qquad (3)$$

The parameters µ and σ are set as learnable parameters.

Figure 3:
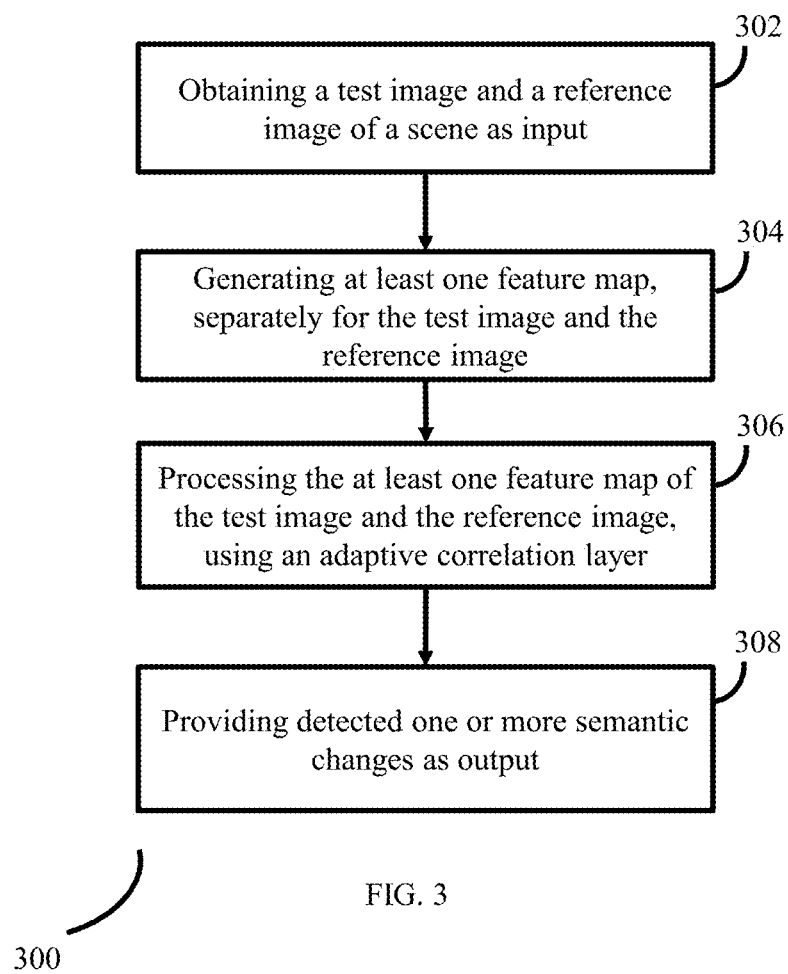
FIG. 3 is a flow diagram depicting steps involved in the process of semantic change detection being performed by the system of FIG. 1, in accordance with some embodiments of the present disclosure.

FIG. 3 is a flow diagram depicting steps involved in the process of semantic change detection being performed by the system of FIG. 1, in accordance with some embodiments of the present disclosure. The system 100 obtains/fetches/collects, at step 302, a reference image and a test image as input, wherein the reference image and the test image are of the same scene, captured at different time points. The reference image acts as a 'ground truth image' and during the semantic change detection, the system 100 determines change(s) happened at the scene during the time period between the reference image and the test image have been captured, and if yes, identifies the changes.

At step 304, the system 100 generates at least one feature map separately for the test image and the reference image. The system 100 is configured to generate one or more feature maps for each image being processed, using the adaptive correlation layer of FIG. 2. The system 100 may use any appropriate image processing technique(s) to generate the feature maps. The feature map of any image contains information on features specific to semantic information in the images.

Figure 4:
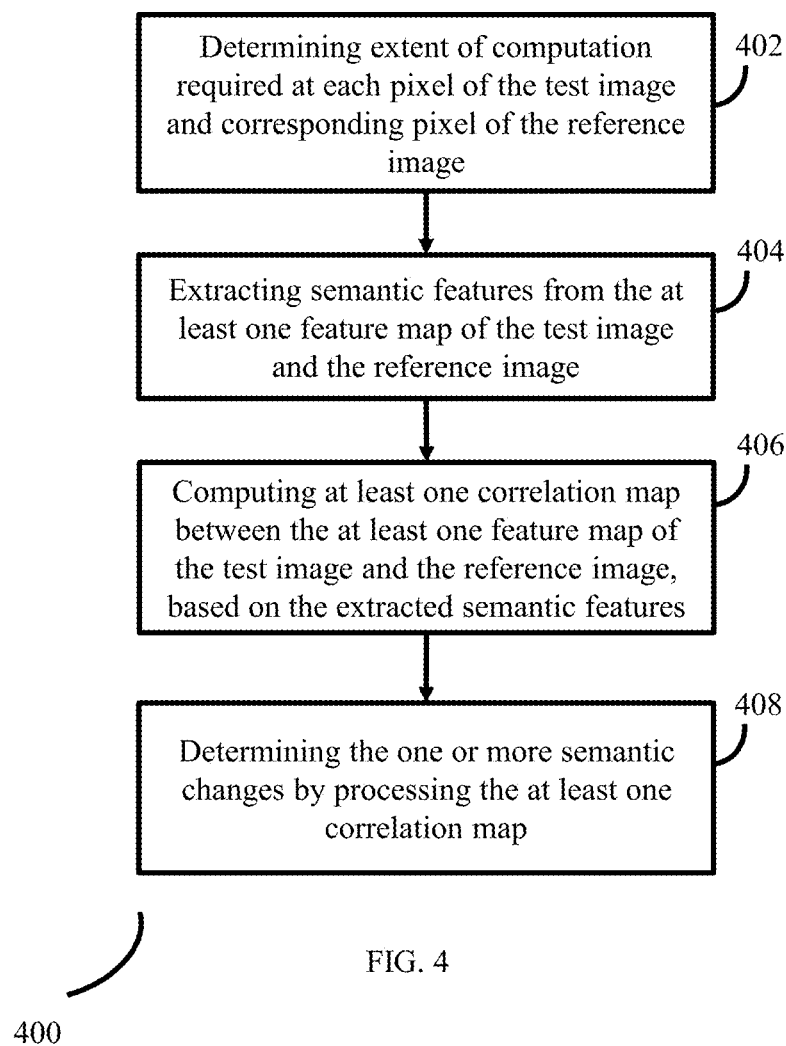
FIG. 4 is a flow diagram depicting steps involved in the process of processing the generated feature maps of the test image and the reference image, using an adaptive correlation layer, by the system of FIG. 1, in accordance with some embodiments of the present disclosure.

Further, at step 306, the system 100 processes the at least one feature map of the test image and the reference image, using the adaptive correlation layer of FIG. 2. Steps involved in this process are depicted in FIG. 4. At step 402, the system 100 determines, by performing the steps and calculation elaborated in description of FIG. 2, extent of computation required at each pixel of the test image and the reference image. Further at step 404 the system 100 extracts semantic features from the feature map of the test image and the reference image. Further, at step 406, the system 100 computes at least one correlation map between the feature maps of the test image and the reference image, by computing correlation using (1). Further, at step 408, the system 100 determines one or more semantic changes, by processing the correlation map. At step 408, the system 100 passes the computed at least one correlation map through a plurality of 2D convolution layers and a softmax layer to assign every pixel with probability of having a change.

The detected one or more semantic changes are then provided as output, at step 308, by the system 100. Example figures depicting the results of change detection are given in FIG. 5. As can be seen, the system 100 highlights differences between the test image and the reference image at output. For example, consider first of FIG. 5. The reference image depicts an empty space, whereas in the corresponding test image, a person can be seen as standing in this space, which means difference between the test image and the reference image is presence of the person. The correlation map between the feature maps of these two images show lower correlation in the region where the person is present. The system 100 outputs the region containing the person as the identified semantic change.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method of semantic change detection, comprising:
   obtaining a test image and a reference image of a scene, as input, via one or more hardware processors;
   generating at least one feature map, separately for each of the test image and the reference image, via one or more hardware processors; and
   processing the generated at least one feature map of the test image and the reference image, using an adaptive correlation layer, via the one or more hardware processors, comprising:
   determining extent of computation required at each pixel of the test image and corresponding pixel of the reference image, by processing the generated at least one feature map, wherein the computation required at each pixel is determined based on amount of information at each pixel;
   extracting a plurality of semantic features from the at least one feature map of the test image and the at least one feature map of the reference image;
   computing at least one correlation map between the at least one feature map of the reference image and the at least one feature map of the test image, based on the determined extent of computation required at each pixel; and
   determining one or more semantic changes between the test image and the reference image by processing the at least one correlation map.

2. The method as claimed in claim 1, wherein the extent of computation at every pixel is determined by:
   concatenating the feature maps of the reference image and the test image; and
   extracting a plurality of the semantic features at each pixel location, by processing the concatenated feature maps using a plurality of two-dimensional (2D) convolution layers.

3. The method as claimed in claim 2, wherein extracting the plurality of semantic features at each pixel location comprises learning a unique neighborhood parameter using the plurality of 2D convolution layers, such that at every pixel, a patch-wise correlation is computed with the unique neighborhood parameter.

4. The method as claimed in claim 2, wherein extracting the plurality of semantic features at each pixel location comprises fixing the neighborhood size at each pixel and learning a weight value for every location in the neighborhood of each of the pixels, such that the patch-wise correlation at every pixel is multiplied with the weights.

5. A system for semantic change detection, comprising:
   one or more hardware processors;
   a communication interface; and
   a memory storing a plurality of instructions, wherein the plurality of instructions when executed, cause the one or more hardware processors to:
   obtain a test image and a reference image of a scene, as input;
   generate at least one feature map, separately for each of the test image and the reference image; and
   process the generated at least one feature map of the test image and the reference image, using an adaptive correlation layer, comprising:
   determining extent of computation required at each pixel of the test image and corresponding pixel of the reference image, by processing the generated at least one feature map, wherein the computation required at each pixel is determined based on amount of information at each pixel;
   extracting a plurality of semantic features from the at least one feature map of the test image and the at least one feature map of the reference image;
   computing at least one correlation map between the at least one feature map of the reference image and the at least one feature map of the test image, based on the determined extent of computation required at each pixel; and
   determining one or more semantic changes between the test image and the reference image by processing the at least one correlation map.

6. The system as claimed in claim 5, wherein the system determines the extent of computation at every pixel by:
concatenating the feature maps of the reference image and the test image; and
extracting a plurality of the semantic features at each pixel location, by processing the concatenated feature maps using a plurality of two-dimensional (2D) convolution layers.

7. The system as claimed in claim 6, wherein the system extracts the plurality of semantic features at each pixel location by learning a unique neighborhood size using the plurality of 2D convolution layers, such that at every pixel, a patch-wise correlation is computed with the unique neighborhood size.

8. The system as claimed in claim 6, wherein the system extracts the plurality of semantic features at each pixel location by fixing the neighborhood size at each pixel and learning a weight value for every location in the neighborhood of each of the pixels, such that the patch-wise correlation at every pixel is multiplied with the weights.

9. A non-transitory computer readable medium for semantic change detection, the semantic change detection by the non-transitory computer readable medium comprising:
obtaining a test image and a reference image of a scene, as input, via one or more hardware processors;
generating at least one feature map, separately for each of the test image and the reference image, via one or more hardware processors; and
processing the generated at least one feature map of the test image and the reference image, using an adaptive correlation layer, via the one or more hardware processors, comprising:
determining extent of computation required at each pixel of the test image and corresponding pixel of the reference image, by processing the generated at least one feature map, wherein the computation required at each pixel is determined based on amount of information at each pixel;
extracting a plurality of semantic features from the at least one feature map of the test image and the at least one feature map of the reference image;
computing at least one correlation map between the at least one feature map of the reference image and the at least one feature map of the test image, based on the determined extent of computation required at each pixel; and
determining one or more semantic changes between the test image and the reference image by processing the at least one correlation map.

10. The non-transitory computer readable medium as claimed in claim 9, wherein the extent of computation at every pixel is determined by:
concatenating the feature maps of the reference image and the test image; and
extracting a plurality of the semantic features at each pixel location, by processing the concatenated feature maps using a plurality of two-dimensional (2D) convolution layers.

11. The non-transitory computer readable medium as claimed in claim 10, wherein extracting the plurality of semantic features at each pixel location comprises learning a unique neighborhood parameter using the plurality of 2D convolution layers, such that at every pixel, a patch-wise correlation is computed with the unique neighborhood parameter.

12. The non-transitory computer readable medium as claimed in claim 10, wherein extracting the plurality of semantic features at each pixel location comprises fixing the neighborhood size at each pixel and learning a weight value for every location in the neighborhood of each of the pixels, such that the patch-wise correlation at every pixel is multiplied with the weights.

* * * * *